April 12, 1955   J. I. HARPER ET AL   2,706,167
PROCESS FOR HYDROGENATING HYDROCARBON OILS
Filed June 16, 1950
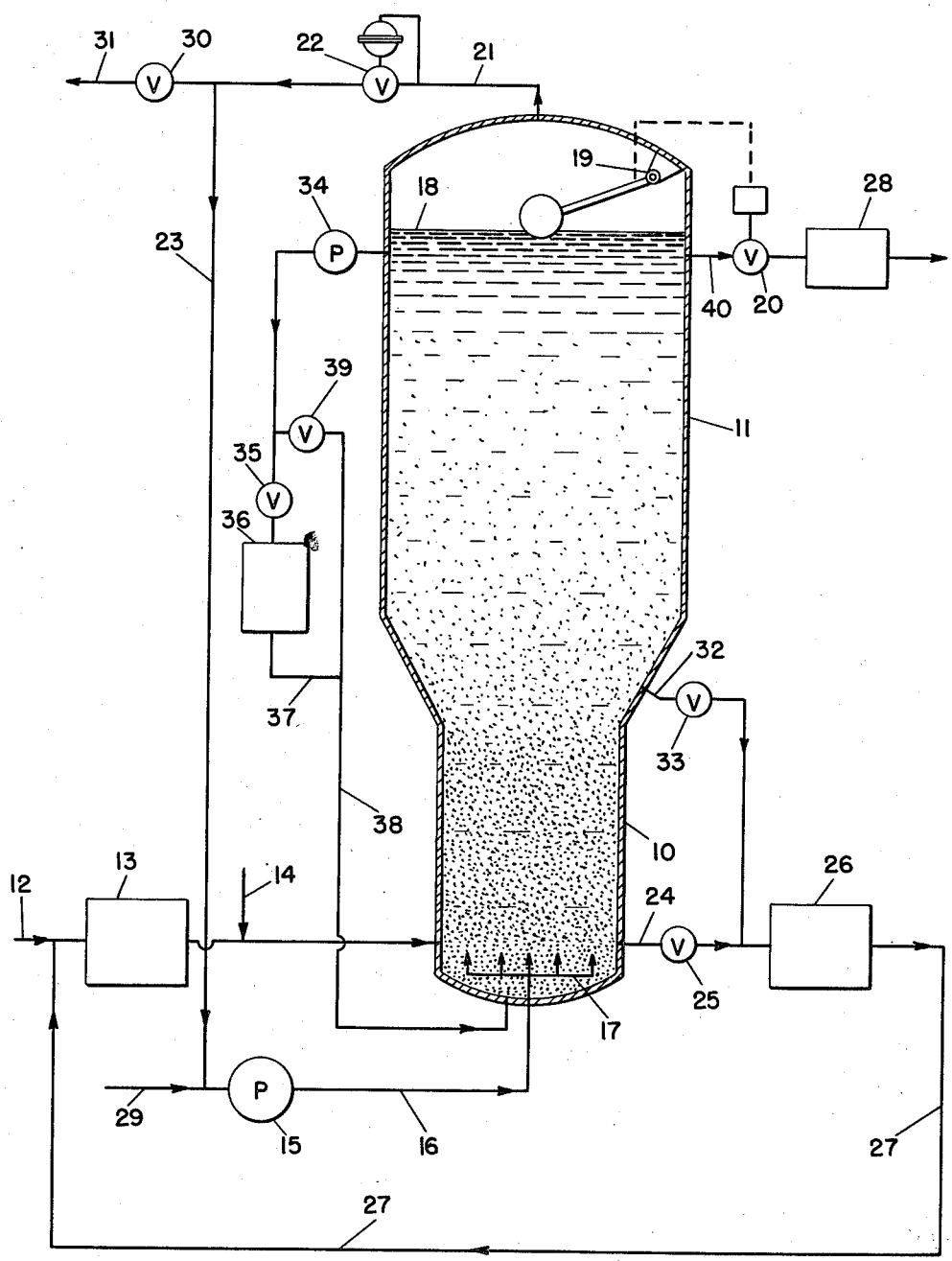
INVENTORS.
JAMES I. HARPER
MARTIN W. LUTHER
BY
*Busser and Harding*
ATTORNEYS

United States Patent Office 2,706,167
Patented Apr. 12, 1955

2,706,167

PROCESS FOR HYDROGENATING HYDROCARBON OILS

James I. Harper, Media, and Martin W. Luther, Swarthmore, Pa., assignors to Sun Oil Company, Philadelphia, Pa., a corporation of New Jersey Application June 16, 1950, Serial No. 168,568

1 Claim. (Cl. 196—35)

This invention relates to the treatment of hydrocarbon oils with hydrogen and particularly concerns a continuous catalytic process for effecting hydrogenation of hydrocarbon oils in liquid phase.

The treatment of liquid hydrocarbon oils, such as gas oil or lubricating oil fractions, with hydrogen in the presence of a hydrogenation catalyst is well known in the prior art. Wide ranges of temperature and pressure conditions have been employed in conducting this type of reaction, with the particular conditions selected depending on the degree of hydrogenation desired. General ranges of temperature and pressure conditions which have been utilized are 250–800° F. and atmospheric to 5000 lbs./sq. in., respectively. The amount of hydrogenation effected increases with increasing temperatures and pressures. Under relatively mild reaction conditions color bodies in the charge oil can be reacted upon to achieve an improvement in color and color stability without substantially altering other physical properties of the oil. Under more severe hydrogenating conditions substantial desulfurization of the charge oil can be effected by conversion of contained sulfur compounds to hydrogen sulfide, and substantial alteration of the physical properties of the oil can be achieved through hydrogenation of aromatics or other unsaturated compounds present in the charge material.

Numerous hydrogenating catalysts have been proposed for carrying out such reactions. Examples are nickel, molybdenum, tungsten, vanadium, tin, zinc, chromium, iron and cobalt, and particularly the oxides and sulfides of these metals. Promoters comprising oxides of other metals have been used in admixture with such catalysts to increase their hydrogenating activity. Carriers such as alumina, silica gel, magnesium oxide and the like have also been employed.

In the continuous catalytic treatment of hydrocarbon oil with hydrogen, the usual procedure comprises percolating the charge oil through a body of catalyst maintained as a fixed bed and in an atmosphere of hydrogen gas. Temperature and pressure conditions in the reaction zone are regulated so as to effect the degree of hydrogenation desired. However, this procedure of employing a fixed bed of catalyst has certain disadvantages, particularly in large scale or plant operation. Channeling of the oil through the bed often occurs, resulting in inefficient utilization of the catalyst. Also, since the hydrogenation reaction is exothermic, heating of the catalyst mass during the reaction is apt to be non-uniform. This may result in overheating of certain parts of the mass while in other parts the temperature may be below that desired for the reaction. Further, when the catalyst becomes inactivated upon continued use, the operation generally must be stopped in order to replace the catalyst with fresh material.

The present invention is directed to and provides an improved method of continuous operation which avoids the aforesaid disadvantages. According to the invention the charge oil is fed in liquid phase into a contact zone containing a suitable quantity of hydrogenation catalyst in particulate or finely divided form. A stream of hydrogen gas is introduced into the lower part of the contact zone in amount in excess of that required for the reaction and at such a rate that the catalyst is suspended, or maintained in a state of hindered settlement, in the oil. This effects intimate contact between the catalyst and oil in the presence of the hydrogen. The catalyst-oil mixture flows upwardly from the contact zone into an enlarged separation or settling zone adapted to permit the catalyst to settle from the treated oil and return to the contact zone where it commingles with further amounts of charge oil. Treated oil from which all or the bulk of the catalyst has been separated is withdrawn from an upper level of the settling zone, while excess hydrogen is removed therefrom at a still higher level and may, if desired, be recycled to the contact zone for re-use.

The more detailed description which follows is made with reference to the accompanying sheet of drawings which diagrammatically illustrates an arrangement of apparatus, shown partly in section, for conducting the process according to the invention.

Referring to the drawings the apparatus therein illustrated includes a vertical chamber or vessel having a lower portion 10 of relatively small diameter and an upper enlarged portion 11. The lower portion 10 constitutes the contact zone in which intimate commingling of oil and catalyst in the presence of hydrogen is effected. The enlarged portion 11 functions as the settling zone for separating catalyst particles from the treated oil.

Charge oil enters the system through line 12 and is sent through heater 13 wherein it is heated sufficiently to maintain the desired hydrogenating temperature in contact zone 10. The desired temperature generally will lie within the range 250–800° F. and more usually will be in the range of 450° F. to 700° F. In starting up the process catalyst may be added to the system through line 14, suitably in the form of a more or less concentrated slurry of catalyst in charge oil; and during continued operation additional catalyst may, if required from time to time, be added in similar manner. The added catalyst should be in finely divided form with particle sizes generally in the range of 10–100 mesh and more preferably in the range of 25–75 mesh.

Hydrogen is forced by means of pump or blower 15 through line 16 into contact zone 10 and is introduced therein through a suitable distributor 17 located near the bottom. The amount of hydrogen so introduced is in excess of that consumed in the reaction. The rate of introduction should be sufficient to cause intimate mixing of the oil and catalyst particles in contact zone 10 and to maintain the catalyst therein in a state of hindered settlement within the oil. Under these conditions reaction between the hydrogen and oil is readily effected, apparently resulting from rapid dissolution of hydrogen in the oil and effective contact of the solution with the catalyst surfaces.

The mixture of oil and catalyst passes upwardly from the restricted lower portion of the apparatus constituting contact zone 10 into the enlarged portion 11. The latter is of such diameter as to cause substantially all or at least the bulk of the catalyst to settle from the treated oil. The catalyst particles thus pass back into contact zone 10 where they come into contact with additional quantities of oil thereby continuously maintaining catalytic conditions within contact zone 10. The treated oil flows to the upper part of settling zone 11 and is withdrawn therefrom through line 40. The upper level of the oil is maintained below the top, as indicated at 18, in any suitable manner, such as by means of level controller 19 which operates valve 20 in the oil outlet line. This provides a space adjacent the top of the chamber for collection of the excess hydrogen and from which the hydrogen may be removed through line 21.

A back pressure control valve 22 may be provided in line 21 for regulating the pressure within the system. Any suitable or desired hydrogen pressure can thus be maintained within contact zone 10 and settling zone 11 by proper setting of valve 22. As a general rule the pressure employed will lie within the range of atmospheric to 5000 lbs./sq. in. and more usually within the range of 50–2500 lbs./sq. in. The excess gas passing from valve 22 may be recycled through line 23 to pump 15 for re-use in the system; or a portion or all of it may be passed by means of valve 30 and line 31 to a purification zone (not shown) in order to remove from the hydrogen contaminant gases, such as hydrogen sulfide or methane, which may have been formed during the reaction. The purified hydrogen may then be returned to the system at the inlet side of pump 15 by means of line 29. Sufficient additional hydrogen is also introduced at this point to compensate for the hydrogen consumed in the reaction.

In operating in the above-described manner replacement of catalyst as required to maintain activity over a continued period of use may readily be accomplished without stopping the operation. One manner of removing catalyst comprises withdrawing relatively small amounts of the catalyst-oil mixture, either intermittently or continuously, from contact zone 10 by means of line 24 and valve 25, and passing the mixture through filter 26 to separate the catalyst particles from the oil. The catalyst-free oil may then be recycled through line 27 to line 12 for re-introduction into the system along with fresh charge oil. Fresh catalyst or catalyst which has been regenerated after use may be introduced intermittently or continuously through line 14 as replacement for catalyst removed in filter 26.

Another procedure for removing used catalyst from the system comprises introducing hydrogen into contact zone 10 at such a rate as to agitate the oil in settling zone 11 sufficiently to prevent settlement of catalyst particles having sizes below some predetermined value. For example, if the fresh catalyst introduced through line 14 has a size of say 25–50 mesh, particles substantially smaller than 50 mesh formed by attrition during prolonged operation of the process can be prevented from settling in zone 11 by providing sufficient agitation. Such particles consequently will be carried out with the treated oil passing through line 40 and can be removed therefrom by means of filter 28. This procedure is advantageous in maintaining the bulk of catalyst in the system within the desired size range. Also, since the catalyst which has undergone such attrition is most apt to have been present in the system for a considerable time, this procedure is further advantageous in tending to eliminate that part of the catalyst which is most likely to have become deactivated.

Alternatively, catalyst particles of generally smaller size than the average may, if desired, be removed in admixture with oil from that portion of the reactor between the lower restricted portion 10 and the upper enlarged portion 11. Thus, such mixture may be removed through line 32 and valve 33 and passed into filter 26 for separating catalyst from the oil, the latter then being returned through line 27 for re-introduction into the reaction zone.

In order to facilitate control of the reaction temperature, oil or a mixture of oil and catalyst can be withdrawn from the reaction vessel and sent through a cooler, thence being returned to the vessel. For instance, oil may be withdrawn by means of pump 34 from the upper part of settling zone 11 and passed through valve 35 and cooler 36 in order to extract sufficient heat generated during reaction to maintain the desired temperature. The cooled oil may then be introduced by means of lines 37 and 38 into the bottom of reaction zone 10 and will aid the hydrogen which enters through distributor 17 in maintaining the catalyst in a state of hindered settlement. As a further aid in maintaining the catalyst in such state, additional amounts of oil from pump 34 may be by-passed around cooler 36 to line 38 by opening valve 39 and thus injected into the bottom of the reaction zone.

Alternative or additional ways of controlling the reaction temperature include the provision of cooling coils within the reaction vessel itself and regulation of the temperature to which the charge is heated in heater 13.

In practicing the process of this invention, there need be no abrupt divisional line between the contact zone and the settling zone, since one may merge into the other to a less pronounced degree than is shown in the drawing, nor need either of the two zones be of strictly cylindrical contour; the only requirement being that the common chamber shall be in its lower part of such dimensions that the catalyst will be maintained in the described state of hindered settlement and in its upper part of such enlarged dimensions as to permit the described settlement of the catalyst.

From the foregoing description it will be apparent that the present method of conducting hydrogenation reactions permits of various control features, including degree of contact of catalyst and oil, temperature regulation and catalyst replacement, which otherwise cannot readily be exercised if a stationary bed of catalyst is employed.

We claim:

In a process for treating hydrocarbon oil boiling within the range of gas oil and lubricating oil with hydrogen in the presence of a particulate hydrogenation catalyst, the steps which comprise feeding such charge oil in liquid phase to a contact zone containing catalyst of a predetermined size range, maintaining in said zone temperature and pressure conditions effective to cause reaction between hydrogen and the liquid oil without vaporization of the oil, flowing the liquid oil directly upwardly into an enlarged settling zone, feeding a stream of hydrogen into a lower part of said contact zone in amount in excess of that required for the reaction, the rate of hydrogen introduction being such that the bulk of catalyst particles of said predetermined size range is present within said contact zone in a state of hindered settlement while catalyst particles generally smaller than said size range are carried upwardly into a lower part of said enlarged settling zone, withdrawing treated oil substantially free of catalyst from said settling zone at a locus above said lower part but below the top, withdrawing unreacted hydrogen adjacent the top of said settling zone, withdrawing a mixture of oil and catalyst from said lower part of the enlarged settling zone adjacent said contact zone and separating the oil from the catalyst, whereby catalyst particles which have undergone attrition are removed from the system, and returning the separated oil to said contact zone for further reaction.

References Cited in the file of this patent

UNITED STATES PATENTS

| | | |
|---|---|---|
| 1,940,651 | Semmes | Dec. 19, 1933 |
| 1,972,948 | Payne | Sept. 11, 1934 |
| 2,333,851 | Egloff | Nov. 9, 1943 |
| 2,421,212 | Medlin | May 27, 1947 |
| 2,438,029 | Atwell | Mar. 16, 1948 |
| 2,517,900 | Loy | Aug. 8, 1950 |